(12) United States Patent
Wolf et al.

(10) Patent No.: US 12,508,561 B2
(45) Date of Patent: Dec. 30, 2025

(54) HIGH-PRESSURE POLYMERIZATION SYSTEM AND HIGH-PRESSURE POLYMERIZATION PROCESS FOR THE POLYMERIZATION OF ETHYLENICALLY UNSATURATED MONOMERS

(71) Applicant: Basell Polyolefine GmbH, Wesseling (DE)

(72) Inventors: Christoph Wolf, Pulheim-Dansweiler (DE); Juergen Mohrbutter, Alfter (DE); Andre-Armand Finette, Cologne (DE); Michael Deuerling, Weilerswist (DE); Danir Khayrullin, Bruehl (DE); Dieter Littmann, Mücke (DE)

(73) Assignee: Basell Polyolefine GmbH, Wesseling (DE)

( * ) Notice: Subject to any disclaimer, the term of this patent is extended or adjusted under 35 U.S.C. 154(b) by 784 days.

(21) Appl. No.: 17/780,201

(22) PCT Filed: Dec. 1, 2020

(86) PCT No.: PCT/EP2020/084032
§ 371 (c)(1),
(2) Date: May 26, 2022

(87) PCT Pub. No.: WO2021/110633
PCT Pub. Date: Jun. 10, 2021

(65) Prior Publication Data
US 2022/0410102 A1   Dec. 29, 2022

(30) Foreign Application Priority Data
Dec. 3, 2019   (EP) ..................................... 19213344

(51) Int. Cl.
*B01J 3/02*   (2006.01)
*B01J 4/00*   (2006.01)
(Continued)

(52) U.S. Cl.
CPC ................. *B01J 3/02* (2013.01); *B01J 4/008* (2013.01); *B01J 19/002* (2013.01); *C08F 2/01* (2013.01);
(Continued)

(58) Field of Classification Search
CPC ..... B01J 3/02; B01J 4/008; C08F 2/01; C08F 2400/04; C08L 2207/066
(Continued)

(56) References Cited

U.S. PATENT DOCUMENTS 4,115,638 A * 9/1978 Becker ..................... B01J 3/002
528/499
4,936,413 A    6/1990 Lee
(Continued)

FOREIGN PATENT DOCUMENTS

EP    266543 A2    5/1988
EP    272512 A2    6/1988
(Continued)

OTHER PUBLICATIONS

The International Search Report and the Written Opinion for PCT/EP2020/084032 mailed Feb. 3, 2021.

*Primary Examiner* — Fred M Teskin

(57) ABSTRACT

A high-pressure polymerization system having a) a polymerization reactor and b) a reactor blow down system having b1) a reactor blow down vessel, having a circular design over a major portion P having a L/D-ratio in the range from 1.75 to 10.0 and containing an aqueous quenching medium, b2) a release line connecting the polymerization reactor with the reactor blow down vessel and having an outlet located above a maximum level for the aqueous quenching medium, b3) a first emergency valve in the release line to open and close fluid communication between the polymerization reactor and the reactor blow down system, and wherein the
(Continued)

release line outlet has a joining piece having an angle (α) between the central axis and a tangent at the reactor blow down vessel in the range from 5° to 70° and the reactor blow down vessel has a vent stack containing a constricted section.

19 Claims, 3 Drawing Sheets

(51) Int. Cl.
*B01J 19/00* (2006.01)
*C08F 2/01* (2006.01)
*C08L 23/06* (2006.01)

(52) U.S. Cl.
CPC ......... *C08L 23/06* (2013.01); *B01J 2204/005* (2013.01); *B01J 2204/007* (2013.01); *B01J 2219/00033* (2013.01); *B01J 2219/00162* (2013.01); *B01J 2219/0027* (2013.01); *B01J 2219/185* (2013.01); *C08L 2207/066* (2013.01)

(58) Field of Classification Search
USPC .................................. 528/499; 422/117, 131
See application file for complete search history.

(56) References Cited

U.S. PATENT DOCUMENTS

| | | | |
|---|---|---|---|
| 4,996,026 | A | 2/1991 | Kanne et al. |
| 8,097,686 | B2 | 1/2012 | Maurizio et al. |
| 9,115,667 | B2 | 8/2015 | Petela et al. |
| 9,631,035 | B2 | 4/2017 | Groos et al. |
| 9,637,569 | B2 | 5/2017 | Neumann et al. |
| 9,738,735 | B1 | 8/2017 | Kuehl et al. |
| 9,821,252 | B2 * | 11/2017 | Lammens ............ B01J 19/2415 |
| 10,472,428 | B2 | 11/2019 | Gonioukh et al. |
| 2010/0056707 | A1 | 3/2010 | Hottovy et al. |
| 2013/0274424 | A1 | 10/2013 | Weiand et al. |
| 2016/0332094 | A1 | 11/2016 | Lammens et al. |
| 2019/0112536 | A1 | 4/2019 | Amblard et al. |

FOREIGN PATENT DOCUMENTS

| | | |
|---|---|---|
| WO | 2017098389 A1 | 6/2017 |
| WO | 2017146823 A1 | 8/2017 |
| WO | 2017194491 A1 | 11/2017 |

* cited by examiner

HIGH-PRESSURE POLYMERIZATION SYSTEM AND HIGH-PRESSURE POLYMERIZATION PROCESS FOR THE POLYMERIZATION OF ETHYLENICALLY UNSATURATED MONOMERS

This application is the U.S. National Phase of PCT International Application PCT/EP2020/084032, filed Dec. 1, 2020, claiming benefit of priority to European Patent Application No. 19213344.5, filed Dec. 3, 2019, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a high-pressure polymerization system for the polymerization of ethylenically unsaturated monomers and to a high-pressure polymerization process for the polymerization of ethylenically unsaturated monomers to obtain an ethylene-based polymer in a high-pressure polymerization system having a continuously operated polymerization reactor.

BACKGROUND OF THE INVENTION

Polyethylene is prepared by different processes. In some instances, polymerization in the presence of free-radical initiators at elevated pressures is used to obtain polyethylene, including low density polyethylene (LDPE).

In some instances, a plant for preparing low density polyethylene includes a polymerization reactor, which is an autoclave, a tubular reactor, or a combination of such reactors, and other equipment. In some instances and for pressurizing the reaction components, a set of two compressors (that is, a primary compressor and a secondary compressor) is used. Sometimes, the set of compressors is designated as a "hyper compressor". In some instances and at the end of the polymerization sequence, a high-pressure polymerization unit further includes apparatuses like extruders and granulators for pelletizing the resulting polymer. In some instances, the polymerization unit includes systems for feeding monomers and comonomers, free-radical initiators, modifiers, or other substances at one or more positions to the polymerization reaction. In some instances, plants for preparing polyethylene are constructed to be run continuously for long periods of time without signs of fatigue, thereby allowing long maintenance intervals.

In some instances, the polymerization process in a LDPE reactor is carried out at high pressures reaching 350 MPa. Under certain temperature and pressure conditions, ethylene decomposes rapidly in an explosive manner, yielding soot, methane, and hydrogen. Associated therewith is a drastic increase in pressure and temperature. In some instance, the decomposition temperatures are excessively high (>1000° C. and present risk for the operational safety of the production plants. In some instances, the temperatures damage the reactor tubes, thereby austenitizing the tube metal. At temperatures at which the metal austenitizes, martensite is formed in the reactor tubes if the material is cooled rapidly.

In some instances, leakage of monomer mixtures is a concern when reaction plants are run under high pressure and at high temperatures. In some instances and after detection of a leakage of monomers or reaction mixture, the polymerization process is interrupted, and the polymerization plant is depressurized.

In some polyethylene plants, depressurization systems use a blow down vessel, which is located inside the reactor bay. In some emergencies, the shutdown includes depressurization of the secondary compressor and the reactor. The reactor content made from or containing hot ethylene and hot polymer is disposed into the reactor blow down vessel via one or more emergency expansion valves, thereby quenching the hot gases with water and separating the waste polymer from ethylene. In some instances, the latter is sent to atmosphere at a safe location and the polymer is retained inside the blow down vessel. In some instances and due to the high pressure with which hot ethylene and hot polymer are introduced into the reactor blow down vessel, the reaction gas, steam, and polymeric particles are released via a vent stack into the atmosphere. In some instances, the amount of polymeric material to be recovered is reduced. In some instances, the gas flow escaping through the vent stack of the reactor blow down vessel generates a loud, annoying noise.

SUMMARY OF THE INVENTION

In a general embodiment, the present disclosure provides a high-pressure polymerization system having
  a) a continuously operable polymerization reactor having a reactor inlet and having a reactor outlet and
  b) a reactor blow down system adapted and arranged to be in fluid communication with the polymerization reactor, the reactor blow down system having
    b1) a reactor blow down vessel, having a circular design over a major portion P having a length L, a diameter D and a L/D-ratio in the range from 1.75 to 10.0 and containing an aqueous quenching medium,
    b2) a release line, connecting the polymerization reactor with the reactor blow down vessel and having a release line outlet for expanding a content of the high-pressure polymerization system made from or containing polymer and gaseous components into the reactor blow down vessel, wherein the release line outlet is located above a maximum level for the aqueous quenching medium, and
    b3) a first emergency valve arranged in the release line and adapted to open and close fluid communication between the polymerization reactor and the reactor blow down system,
  wherein the release line outlet has a joining piece, having a central axis and arranged such that an angle ($\alpha$), formed between the central axis of the joining piece and a tangent located at the intersection of the central axis with the circular periphery of the major portion P of the reactor blow down vessel and having the same inclination as the central axis with respect to the horizontal plane containing this intersection, is in the range from 5° to 70°,
  wherein the reactor blow down vessel further having a vent stack containing a constricted section.

In some embodiments, the joining piece is arranged tangentially to the horizontal circumference of the major portion P.

In some embodiments, the joining piece is inclined downwards such that the stream of the content of the high-pressure polymerization system made from or containing polymer and gaseous components is directed towards a surface of the aqueous quenching medium in the reactor blow down vessel.

In some embodiments, an angle of inclination ($\beta$) between the central axis of the joining piece and horizontal plane passing through the major portion P of the reactor blow down vessel at the position where the central axis crosses the horizontal circumference of the major portion P is in the range from 3° to 89°.

In some embodiments, a multitude of release lines connects the polymerization reactor with the reactor blow down vessel.

In some embodiments, a multitude of joining pieces of the release line outlets of the release lines connecting the polymerization reactor with the reactor blow down vessel are located on the same horizontal level of the major portion P of the reactor blow down vessel, and/or
  a multitude of joining pieces of the release line outlets of the release lines connecting the polymerization reactor with the reactor blow down vessel are equidistantly or evenly distributed over the circumference of the major portion P of the reactor blow down vessel.

In some embodiments, a first set of joining pieces of release line outlets of release lines connecting the polymerization reactor with the reactor blow down vessel is located on the same horizontal level of the major portion P of the reactor blow down vessel, wherein
  a second set of joining pieces of release line outlets of release lines connecting the polymerization reactor with the reactor blow down vessel is aligned horizontally on the major portion P of the reactor blow down vessel at a horizontal level different from the horizontal level of the first set of joining pieces.

In some embodiments, the high-pressure polymerization system further has
  c) a pressure control valve,
  d) a post-reactor cooler, and
  e) a separation vessel or a series of separation vessels,
  wherein the post-reactor cooler is in fluid communication with the continuously operated polymerization reactor via f) a first connecting line, wherein the separation vessel or the series of separation vessels is in fluid communication with the post-reactor cooler via g) a second connecting line, and wherein the pressure control valve is adapted and arranged to control fluid communication between the continuously operated polymerization reactor and the post-reactor cooler.

In some embodiments, the vent stack is a vertical tube having an inner diameter from 0.4 m to 1.4 m and the constricted section of the vent stack has a smaller inner diameter, thereby rendering the open cross-sectional area at the constricted section from 10% to 60% of the open cross-sectional area of the vertical tube.

In some embodiments, the release line connecting the polymerization reactor with the reactor blow down vessel is heated to a temperature from 160° C. to 240° C.

In some embodiments, the reactor blow down system further has
  b4) a nitrogen blanketing system, and/or
  b5) a fill-level control system.

In some embodiments, the reactor blow down system further has
  b6) a reactor blow down dump vessel arranged and adapted to be in fluid communication with the reactor blow down vessel, and
  b7) a drain valve in fluid communication between the reactor blow down vessel and the reactor blow down dump vessel adapted and arranged to open or close fluid communication between the reactor blow down vessel and the reactor blow down dump vessel,
wherein the reactor blow down vessel is installed above the reactor blow down dump vessel.

In some embodiments, the present disclosure further provides a process for polymerizing ethylene, and optionally one or more co-monomers, to obtain an ethylene-based polymer in a high-pressure polymerization system including the steps of
  A) monitoring the high-pressure polymerization system for a disturbance,
  B) opening a first emergency valve b3) when a disturbance occurs, thereby allowing the content of the polymerization system made from or containing polymer and gaseous components to expand into the reactor blow down vessel via the release line,
  C) contacting the content of the polymerization system in the reactor blow down vessel with the aqueous quenching medium, thereby obtaining an aqueous polymer slurry, and
  D) separating the aqueous polymer slurry and the gaseous components.

In some embodiments, the process further includes the step of
  E) transferring the aqueous polymer slurry to the reactor blow down dump vessel by opening a drain valve b7).

In some embodiments, upon the occurrence of a disturbance or temporally offset to the occurrence of a disturbance, steam is injected into the reactor blow down vessel.

In some embodiments, the injection of steam is suspended after about 120 to 300 seconds upon the occurrence of a disturbance.

BRIEF DESCRIPTION OF THE DRAWINGS

To assist those of ordinary skill in the relevant art in making and using the subject matter hereof, reference is made to the appended drawings, wherein.

DETAILED DESCRIPTION OF THE INVENTION

Figure 1:
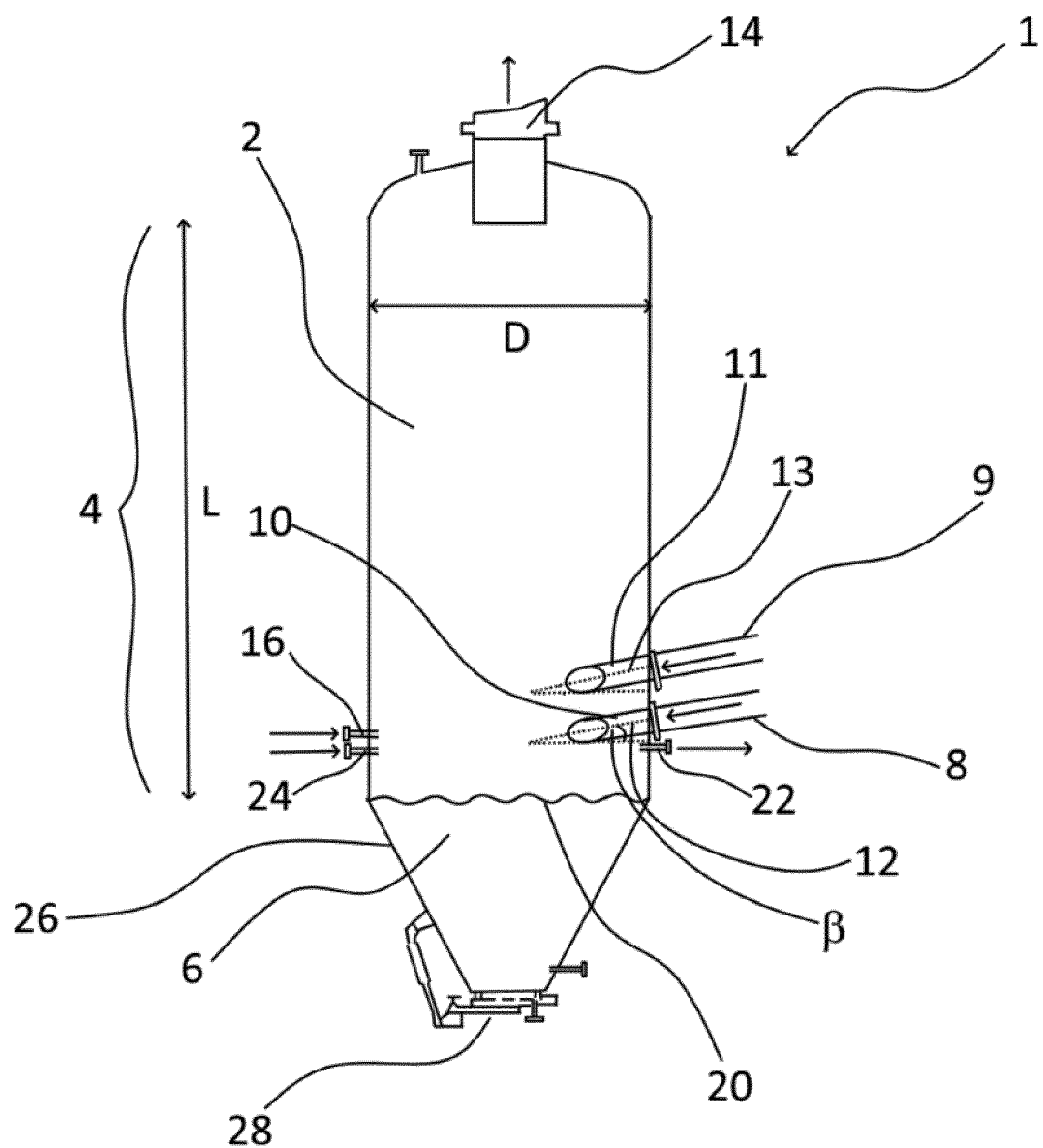
FIG. 1 is a schematic of a reactor blow down system.

In some embodiments, the present disclosure provides a high-pressure polymerization system having
  a) a continuously operable polymerization reactor having a reactor inlet and having a reactor outlet and
  b) a reactor blow down system adapted and arranged to be in fluid communication with the polymerization reactor.

In some embodiments, the present disclosure further provides a process for polymerizing ethylene, and optionally one or more co-monomers, thereby obtaining an ethylene-based polymer in the high-pressure polymerization system. In some embodiments and when a shutdown occurs due to a disturbance, the process allows for quenching the reactor content made from or containing hot ethylene and hot polymer in a reactor blow down vessel, separating the polymer from depressurized ethylene, and retaining polymer and solids before releasing the gas into the atmosphere via a vent stack. In some embodiments, the process occurs at a comparatively low noise level.

In some embodiments of the high-pressure polymerization system, the monomers are brought to the polymerization pressure by one or more compressors in a sequence of compression stages, the compressed monomers are optionally passed through a pre-heater or a pre-cooler and then transferred into the polymerization reactor at the reactor inlet. In addition, a reaction mixture obtained by the polymerization leaves the reactor at the reactor outlet through a pressure control valve and is optionally cooled by a post-reactor cooler. Subsequently, the reaction mixture is separated into polymeric and gaseous components in two or more stages, where the gaseous components separated off in a first stage at an absolute pressure of from 15 MPa to 50 MPa are recycled to the one or more compressors via a high-pressure gas recycle line and the gaseous components separated off in a second stage at an absolute pressure in the range of from 0.1 MPa to 0.5 MPa are recycled to the first stage of the sequence of compression stages via a low-pressure gas recycle line, and the polymeric components obtained by the polymerization are transformed into pellets.

In some embodiments, the high-pressure polymerization system further has c) a pressure control valve,
d) a post-reactor cooler, and
e) a separation vessel or a series of separation vessels,
wherein the post-reactor cooler is in fluid communication with the continuously operated polymerization reactor via f) a first connecting line, wherein the separation vessel or the series of separation vessels is in fluid communication with the post reactor cooler via g) a second connecting line, and wherein the pressure control valve is adapted and arranged to control fluid communication between the continuously operated polymerization reactor and the post-reactor cooler.

As used herein, the term "and/or" is defined inclusively, such that the term "a and/or b" includes the sets: "a and b", "a or b", "a", and "b". In some embodiments, "and" in "a and/or b" refers to two entities "a" and "b", wherein one of the entities is present.

In some embodiments, the polymerization is a homopolymerization of ethylene or a copolymerization of ethylene with one or more other monomers, wherein these monomers are free-radically copolymerizable with ethylene under high pressure. In some embodiments, the copolymerizable monomers are selected from the group consisting of α,β-unsaturated $C_3$-$C_8$-carboxylic acids, derivatives of α,β-unsaturated $C_3$-$C_8$-carboxylic acids, and 1-olefins. In some embodiments, the derivatives of α,β-unsaturated $C_3$-$C_8$-carboxylic acids are selected from the group consisting of unsaturated $C_3$-$C_{15}$-carboxylic esters and anhydrides. In some embodiments, the comonomers are vinyl carboxylates. In some embodiments, the vinyl carboxylates are selected from the group consisting of vinyl acetate and vinyl propionate. In some embodiments, the comonomers are selected from the group consisting of propene, 1-butene, 1-hexene, acrylic acid, n-butyl acrylate, tert-butyl acrylate, 2-ethylhexyl acrylate, vinyl acetate, and vinyl propionate.

In some embodiments and for copolymerization, the proportion of comonomer or comonomers in the reaction mixture is from 1 to 50% by weight, alternatively from 3 to 40% by weight, based on the amount of monomers, that is, the sum of ethylene and other monomers. In some embodiments, the comonomers are fed at more than a single point to the reactor set-up. In some embodiments the comonomers are fed to the suction side of the secondary compressor.

As used herein, the terms "polymers" or "polymeric materials" refer to substances made from or containing at least two monomer units. In some embodiments, the polymers or polymeric materials are low density polyethylenes having an average molecular weight Mn of more than 20000 g/mole. As used herein, the term "low density polyethylene" (LDPE) includes ethylene homopolymers and ethylene copolymers. In some embodiments, the process of the present disclosure prepares oligomers, waxes, and polymers having a molecular weight $M_n$ of less than 20000 g/mole.

In some embodiments, the process of the present disclosure is a radical polymerization carried out in the presence of free-radical polymerization initiators. In some embodiments, initiators for starting the polymerization in the respective reaction zones are substances that produce radical species under the conditions in the polymerization reactor. In some embodiments, the initiators are selected from the group consisting of oxygen, air, azo compounds, and peroxidic polymerization initiators. In some embodiments, the polymerization is carried out by using oxygen, fed in the form of pure oxygen or as air. In some embodiments, the polymerization is initiated with oxygen, and the initiator is first mixed with the ethylene feed and then fed to the reactor. In some embodiments, a stream made from or containing monomer and oxygen is fed to the beginning of the polymerization reactor. In some embodiments, the stream made from or containing monomer and oxygen is fed to one or more points along the reactor, thereby creating two or more reaction zones. In some embodiments, the initiator is selected from the group consisting of organic peroxides and azo compounds. In some embodiments, individual initiators or mixtures of various initiators are used. In some embodiments, initiators are commercially available from Akzo Nobel under the trade names Trigonox® or Perkadox®.

In some embodiments, the molecular weight of the polymers is altered by the addition of modifiers which act as chain-transfer agents. In some embodiments, the modifiers are selected from the group consisting of hydrogen, aliphatic and olefinic hydrocarbons, ketones, aldehydes, and saturated aliphatic alcohols. In some embodiments, the hydrocarbons are selected from the group consisting of propane, butane, pentane, hexane, cyclohexane, propene, 1-butene, 1-pentene, and 1-hexene. In some embodiments, the ketones are selected from the group consisting of acetone, methyl ethyl ketone (2-butanone), methyl isobutyl ketone, methyl isoamyl ketone, diethyl ketone, and diamyl ketone. In some embodiments, the aldehydes are selected from the group consisting of formaldehyde, acetaldehyde and propionaldehyde. In some embodiments, the saturated aliphatic alcohols are selected from the group consisting of methanol, ethanol, propanol, isopropanol, and butanol. In some embodiments, the modifiers are selected from the group consisting of saturated aliphatic aldehydes, 1-olefins, and aliphatic hydrocarbons. In some embodiments, the saturated aliphatic aldehyde is propionaldehyde. In some embodiments, the 1-olefins are selected from the group consisting of propene, 1-butene, and 1-hexene. In some embodiments, the aliphatic hydrocarbon is propane.

In some embodiments, the high-pressure polymerization is carried out at pressures of from 110 MPa to 500 MPa, alternatively from 160 MPa to 350 MPa, alternatively from 200 MPa to 330 MPa for polymerization in a tubular reactor. In some embodiments, the high-pressure polymerization is carried out at pressures of from 110 MPa to 500 MPa, alternatively from 110 MPa to 300 MPa, alternatively from 120 MPa to 280 MPa for polymerization in an autoclave reactor. In some embodiments, the polymerization temperatures are in the range of from 100° C. to 350° C., alternatively from 180° C. to 340° C., alternatively from 200° C. to 330° C. for polymerization in a tubular reactor. In some embodiments, the polymerization temperatures are in the range of from 100° C. to 350° C., alternatively from 110° C. to 320° C., alternatively from 120° C. to 310° C. for polymerization in an autoclave reactor.

In some embodiments, the high-pressure reactors are tubular reactors or autoclave reactors. In some embodiments, the polymerization is carried out in one or more tubular reactors or one or more autoclave reactors or combinations of such reactors. In some embodiments, the polymerization reactor is a tubular reactor.

In some embodiments, the high-pressure autoclave reactors are stirred reactors and have a length-to-diameter ratio in a range from 2 to 30, alternatively from 2 to 20. In some embodiments, the autoclave reactors have one or more reaction zones, alternatively from 1 to 6 reaction zones, alternatively from 1 to 4 reaction zones. The number of reaction zones depends on the number of agitator baffles which separate individual mixed zones within the autoclave reactor. In some embodiments and in high-pressure polymerization systems, the polymerization or the first polymerization is carried out in an autoclave reactor, that is, the polymerization reactor is an autoclave reactor or the first reactor of a series of reactors is an autoclave reactor. In some embodiments, the reaction mixture coming from the compressors is first passed through a pre-cooler before entering the autoclave reactor.

In some embodiments, the tubular reactors are long, thick-walled pipes, alternatively about 0.5 km to 4 km, alternatively 1 km to 3 km, alternatively from 1.5 km to 2.5 km long. In some embodiments, the inner diameter of the pipes is in the range of from about 30 mm to 120 mm, alternatively from 60 mm to 100 mm. In some embodiments, the tubular reactors have a length-to-diameter ratio of greater than 1000:1, alternatively from 10000:1 to 40000:1, alternatively from 25000:1 to 35000:1.

In some embodiments, the tubular reactors have at least two reaction zones, alternatively from 2 to 6 reaction zones, alternatively from 2 to 5 reaction zones. The number of reaction zones is given by the number of feeding points for the initiator. In some embodiments, a feeding point is an injection point for a solution of azo compounds or organic peroxides. Fresh initiator is added to the reactor, where the initiator decomposes into free radicals and initiates further polymerization. It is believed that the generated heat of the reaction raises the temperature of the reaction mixture because more heat is generated than is removed through the walls of the tubular reactor. The rising temperature increases the rate of decomposition of the free-radical initiators and accelerates polymerization until the free-radical initiator is consumed. Thereafter, no further heat is generated, and the temperature decreases because the temperature of the reactor walls is lower than that of the reaction mixture. Accordingly, the part of the tubular reactor downstream of an initiator feeding point wherein the temperature rises is the "reaction" zone. The part thereafter is a "cooling" zone, wherein the temperature decreases. The amount and nature of added free-radical initiators determine how much the temperature rises and accordingly allow for adjusting that value. In some embodiments, the temperature rise is set to be in the range of from 70° C. to 170° C. in the first reaction zone and 50° C. to 130° C. for subsequent reaction zones, depending on the product specifications and the reactor configuration. In some embodiments, the tubular reactor is equipped with cooling jackets for removing the heat of the reaction. In some embodiments, the reaction zones of the tubular reactor are cooled by cooling jackets.

In some embodiments, the compression of the reaction gas composition to the polymerization pressure is carried out by one or more compressors in a sequence of compression stages. In some embodiments, a primary compressor first compresses the reaction gas composition to a pressure of from 10 MPa to 50 MPa and a secondary compressor further compresses the reaction gas composition to the polymerization pressure of from 110 MPa to 500 MPa. In some embodiments, the primary compressor and the secondary compressor are multistage compressors. In some embodiments, one or more stages of one or both compressors are separated. In some embodiments, the stages are divided into separated compressors. In some embodiments, a series of a primary compressor and a secondary compressor is used for compressing the reaction gas composition to the polymerization pressure. In some embodiments, the whole primary compressor is designated as "primary" compressor. In some embodiments, the one or more first stages of the primary compressor, which compress the recycle gas from the low-pressure product separator to the pressure of the fresh ethylene feed, are designated as the "booster" compressor and the one or more subsequent stages are designated as the "primary" compressor even though the booster compressor and the subsequent stages are part of the same apparatus.

In some embodiments, the high-pressure polymerization system has a pre-heater upstream of a tubular reactor, for heating the reaction gas composition to a temperature capable of initiating the polymerization. In some embodiments, the reaction gas composition provided by the secondary compressor is fed via a pre-heater to the inlet of the tubular reactor. In some embodiments, part of the reaction gas composition compressed by the secondary compressor is fed via the pre-heater to the inlet of the tubular reactor and the remainder of the reaction gas composition compressed by the secondary compressor is fed as one or more side streams to the tubular reactor downstream of the inlet of the tubular reactor. In some embodiments, from 30 to 90% by weight, alternatively from 40 to 70% by weight, of the reaction gas composition provided by the secondary compressor is fed to the inlet of the tubular reactor and from 10 to 70% by weight, alternatively from 30 to 60% by weight, of the reaction gas composition provided by the secondary compressor is fed as one or more side streams to the tubular reactor downstream of the inlet of the tubular reactor.

In some embodiments, the high-pressure polymerization system for carrying out the polymerization includes the polymerization reactor, the rector blow down system, and two or more gas recycle lines for recycling unreacted monomers into the polymerization process. In some embodiments, the reaction mixture obtained in the polymerization reactor is transferred to a first separation vessel and separated into a gaseous fraction and a liquid fraction at an absolute pressure of from 15 MPa to 50 MPa. In some embodiments, the first separation vessel is referred to as a high-pressure product separator. The gaseous fraction withdrawn from the first separation vessel is fed via a high-pressure gas recycle line to the suction side of the secondary compressor. In some embodiments and in the high-pressure gas recycle line, the gas is purified by several purification steps. In some embodiments, the removed components are entrained polymer or oligomers. The liquid fraction withdrawn from the first separation vessel is transferred to a second separation vessel and further separated, at reduced pressure, alternatively at an absolute pressure in the range of from 0.1 MPa to 0.5 MPa, in polymeric and gaseous components. In some embodiments, the liquid fraction withdrawn from the first separation vessel is made from or containing dissolved monomers in an amount of 20 to 40% of weight. In some embodiments, the monomers are ethylene and comonomers. In some embodiments, the second separation vessel is referred to as a low-pressure product separator. In some embodiments, the gaseous fraction withdrawn from the second separation vessel is fed via a low-pressure gas recycle line to the primary compressor, alternatively to the foremost of the stages. In some embodiments, the low-pressure gas recycle line provides several purification steps for purifying the gas. In some embodiments, the high-pressure polymerization system further includes additional separation steps for separating additional gaseous fractions from the reaction mixtures and additional gas recycle lines for feeding such additional gaseous fractions made from or containing unreacted monomers to a compressor. In some embodiments, the additional separation steps are between the first separation step and the second separation step operating at an intermediate pressure.

In some embodiments, the recycled gas coming from the low-pressure gas recycle line is compressed by the first stages of the primary compressor to the pressure of the fresh feed of ethylenically unsaturated monomers and thereafter combined with the fresh gas feed, and the combined gases are further compressed in the primary compressor to the pressure of from 10 MPa to 50 MPa. In some embodiments, the unsaturated monomers are ethylene. In some embodiments, the primary compressor has five or six compression stages, with two or three before adding the fresh gas and two or three after adding the fresh gas. In some embodiments, secondary compressor has two stages; with a first stage compressing the gas to a pressure in the range from 50 MPa to 150 MPa and the second stage further compressing the gas to the final polymerization pressure.

In some embodiments, the pressure within the polymerization reactor is controlled by a pressure control valve, which is arranged at the outlet of the polymerization reactor and through which the reaction mixture leaves the reactor. In some embodiments, the pressure control valve is a valve arrangement for reducing the pressure of the reaction mixture leaving the reactor to the pressure within the first separation vessel.

In some embodiments, the high-pressure polymerization system has a post-reactor cooler downstream of the polymerization reactor for cooling the reaction mixture. In some embodiments, post-reactor cooler is arranged upstream of the pressure control valve. In some embodiments, the post-reactor cooler is arranged downstream of the pressure control valve. In some embodiments, the post-reactor cooler is arranged downstream of the pressure control valve.

In some embodiments, the polymerization reactors are in a chamber having a surrounding protective wall.

In some embodiments, the polymeric components obtained by the polymerization are finally transformed into pellets. In some embodiments, the pellets are formed by extruders or granulators. In some embodiments, the ethylene-based polymer produced by the process is a LDPE having a density in the range from 0.910 g/cm$^3$ to 0.940 g/cm$^3$.

In some embodiments, the high-pressure polymerization system further has
  b) a reactor blow down system adapted and arranged to be in fluid communication with the polymerization reactor, the reactor blow down system having
    b1) a reactor blow down vessel, having a circular design over a major portion P having a length L, a diameter D and a L/D-ratio in the range from 1.75 to 10.0, alternatively in the range from 2.0 to 6.0, alternatively in the range from 2.0 to 4.0, and containing an aqueous quenching medium,
    b2) a release line, connecting the polymerization reactor a) with the reactor blow down vessel and having a release line outlet for expanding a content of the high-pressure polymerization system made from or containing polymer and gaseous components into the reactor blow down vessel, wherein the release line outlet is located above a maximum level for the aqueous quenching medium, and
    b3) a first emergency valve arranged in the release line and adapted to open and close fluid communication between the polymerization reactor and the reactor blow down system.

The release line outlet has a joining piece for connecting the release line with the major portion P of the reactor blow down vessel. In some embodiments, the joining piece has a tubular, alternatively cylindrical hollow, space through which gaseous and polymeric material enter the reactor blow down vessel. The central axis passes through this tubular, alternatively hollow, space. The joining piece has a central axis and is arranged such that an angle ($\alpha$), formed between the central axis of the joining piece and a tangent located at the intersection of the central axis with the circular periphery of the major portion P of the reactor blow down vessel and having the same inclination as the central axis with respect to the horizontal plane containing this intersection, is in the range from 5° to 70°, alternatively from 10° to 60°, alternatively from 15° to 50°.

In some embodiments, a joining piece, a multitude of pieces, or the entirety of pieces are arranged tangentially to the horizontal circumference of the major portion P.

In some embodiments, a joining piece, a multitude of pieces, or the entirety of joining pieces are inclined downwards such that the stream of the content of the high-pressure polymerization system made from or containing polymer and gaseous components is directed towards a surface of the aqueous quenching medium in the reactor blow down vessel.

In some embodiments, a joining piece, a multitude of pieces, or the entirety of joining pieces have an angle of inclination ($\beta$) between the central axis of the joining pieces and horizontal planes passing through the major portion P of the reactor blow down vessel at the positions where the central axes cross the horizontal circumference of the major portion P is in the range from 3° to 89°, alternatively from 5° to 45°.

In some embodiments, the fluid communication between the polymerization reactor and the reactor blow down system is provided by a release line. In some embodiments, a multitude of release lines connects the polymerization reactor with the reactor blow down vessel.

In some embodiments, a multitude or the entirety of the joining pieces of the release line outlets of the release lines connecting the polymerization reactor with the reactor blow down vessel are located on the same horizontal level of the major portion P of the reactor blow down vessel. In some embodiments, a multitude or the entirety of the joining pieces of the release line outlets of the release lines connecting the polymerization reactor with the reactor blow down vessel are equidistantly or evenly distributed over the circumference of the major portion P of the reactor blow down vessel. In some embodiment, the distribution is over the horizontal of the circumference. In some embodiments, a limited set of joining pieces of the release line outlets of the release lines connecting the polymerization reactor with the reactor blow down vessel are evenly or equidistantly distributed over the circumference of the major portion P of the reactor blow down vessel. In some embodiment, the distribution is over the horizontal of the circumference.

In some embodiments, a multitude of the joining pieces of the release line outlets of the release lines connecting the polymerization reactor with the reactor blow down vessel are equidistantly or evenly distributed over the circumference of the major portion P of the reactor blow down vessel. In some embodiments, the entirety of the joining pieces of the release line outlets of the release lines connecting the polymerization reactor with the reactor blow down vessel are equidistantly or evenly distributed over the circumference of the major portion P of the reactor blow down vessel. In some embodiments, a limited set of joining pieces of the release line outlets of the release lines connecting the polymerization reactor with the reactor blow down vessel are evenly or equidistantly distributed over the circumference of the major portion P of the reactor blow down vessel. In some embodiment, the distribution is over the horizontal of the circumference.

In some embodiments, a multitude or the entirety of the joining pieces of the release line outlets of the release lines connecting the polymerization reactor with the reactor blow down vessel are arranged in two or more sets of joining pieces located on two or more horizontal levels. In some embodiments, a first set of joining pieces of release line outlets of the release lines connecting the polymerization reactor with the reactor blow down vessel is located on the same horizontal level of the major portion P of the reactor blow down vessel. In some embodiments, a first set of joining pieces of release line outlets of the release lines connecting the polymerization reactor with the reactor blow down vessel is located on the same horizontal level of the major portion P of the reactor blow down vessel, wherein a multitude of the first set of joining pieces is equidistantly or evenly distributed over the circumference of the major portion P of the reactor blow down vessel. In some embodiments, a second set of joining pieces of release line outlets of the release lines connecting the polymerization reactor with the reactor blow down vessel is aligned horizontally on the major portion P of the reactor blow down vessel at a horizontal level different from the horizontal level of the first set of joining pieces. In some embodiments, the second set of joining pieces is the remaining joining piece. In some embodiments, a second set of joining pieces of release line outlets of the release lines connecting the polymerization reactor with the reactor blow down vessel is aligned horizontally on the major portion P of the reactor blow down vessel at a horizontal level different from the horizontal level of the first set of joining pieces, wherein a multitude of the second set of joining pieces is equidistantly or evenly distributed over the circumference of the major portion P of the reactor blow down vessel. In some embodiments, some joining pieces of the first set, the second set, or the first and second sets, of joining pieces belong to those joining pieces which are evenly or equidistantly distributed over the circumference of the major portion P of the reactor blow down vessel. In some embodiments, the joining pieces evenly or equidistantly distributed over the circumference of the major portion P of the reactor blow down vessel is a reduced number of the joining pieces.

In some embodiments, the release lines, connecting the polymerization reactor with the reactor blow down vessel, are heated. In some embodiments, the release lines are heated over the whole length including the joining pieces. In some embodiments, the release lines are heated to a temperature from 160° C. to 240° C., alternatively from 180° C. to 220° C. In some embodiments, the heating occurs electrically, alternatively with medium-pressure steam, alternatively by conveying medium-pressure steam through heating jackets.

In some embodiments, the reactor blow down system further has
- b4) a nitrogen blanketing system, and/or
- b5) a fill-level control system.

In some embodiments, the reactor blow down vessel b1) further has a vent stack, serving as a gas outlet for removing gaseous components separated from the aqueous polymer slurry. In some embodiments, the vent stack has a constricted section. In some embodiments, the constricted section is a throttle. In some embodiments, the vent stack is a vertical tube having an inner diameter from 0.4 m to 1.4 m, alternatively from 0.5 m to 1.1 m, alternatively from 0.7 m to 0.9 m. In some embodiments, the constricted section of the vent stack has a smaller inner diameter than the vertical tube, thereby providing an open cross-sectional area at the constricted section from 10% to 60%, alternatively from 15% to 50%, alternatively from 15% to 50%, of the open cross-sectional area of the vertical tube. In some embodiments, the upper opening of the vent stack is from 20 m to 80 m above ground level, alternatively from 30 m to 60 m above ground level, alternatively from 40 m to 50 m above ground level.

In some embodiments, the reactor blow down vessel is nitrogen blanketed although being open to the atmosphere.

In some embodiments, the reactor blow down system further has
- b6) a reactor blow down dump vessel arranged and adapted to be in fluid communication with the reactor blow down vessel, and
- b7) a drain valve in fluid communication between the reactor blow down vessel and the reactor blow down dump vessel adapted and arranged to open or close the fluid communication between the reactor blow down vessel and the reactor blow down dump vessel,
  wherein the reactor blow down vessel is installed above the reactor blow down dump vessel.

In some embodiments, the present disclosure further provides a process for polymerizing ethylene, and optionally one or more comonomers, to obtain an ethylene-based polymer in a high-pressure polymerization system having
- a) a continuously operated polymerization reactor having a reactor inlet and having a reactor outlet and
- b) a reactor blow down system adapted and arranged to be in fluid communication with the polymerization reactor, the reactor blow down system having
  - b1) a reactor blow down vessel, having a circular design over a major portion P having a length L, a diameter D and a L/D-ratio in the range from 1.75 to 10.0, alternatively from 2.0 to 6.0, alternatively from 2.0 to 4.0 and containing an aqueous quenching medium,
  - b2) a release line, connecting the polymerization reactor with the reactor blow down vessel and have a release line outlet for expanding a content of the high-pressure polymerization system made from or containing polymer and gaseous components into the reactor blow down vessel, wherein the release line outlet is located above a maximum level for the aqueous quenching medium, and
  - b3) a first emergency valve arranged in the release line and adapted to open and close fluid communication between the polymerization reactor and the reactor blow down system, wherein the release line outlet has a joining piece, having a central axis and arranged such that an angle (α) formed, between the central axis of the joining piece and a tangent located at the intersection of the central axis with the circular periphery of the major portion P of the reactor blow down vessel and having the same inclination as the central axis with respect to the horizontal plane containing this intersection, is in the range from 5° to 70°, wherein the reactor blow down vessel further having a vent stack containing a constricted section, and wherein the process includes the steps of A) monitoring the high-pressure polymerization system for a disturbance, and B) opening the first emergency valve b3) when a disturbance occurs, thereby allowing the content of the polymerization system made from or containing polymer and gaseous components to expand into the reactor blow down vessel via the release line, alternatively a multitude of release lines, C) contacting the content of the polymerization system in the reactor blow down vessel with the aqueous quenching medium, thereby obtaining an aqueous polymer slurry, and D) separating the aqueous polymer slurry and the gaseous components.

In some embodiment, the process further includes the step of

E) transferring the aqueous polymer slurry to the reactor blow down dump vessel by opening drain valve b7).

In some embodiments, the high-pressure polymerization system is monitored for a disturbance. When a disturbance occurs, the first emergency valve is opened and the content of the polymerization system made from or containing polymer and gaseous components expands into the reactor blow down vessel, thereby interrupting the high-pressure polymerization in a controlled manner. As used herein, the term "disturbance" refers to a deviation in polymerization conditions to support terminating the polymerization. The monitoring of the high-pressure polymerization system occurs by measuring various parameters with respect to the conditions of the high-pressure polymerization system. These parameters include pressures and temperatures at various positions of the polymerization system, filling levels of vessels, positions of valves, hydrocarbon concentrations in the surrounding of the high-pressure polymerization system, and vibrations in the polymerization system. In some embodiments and if a parameter deviates by more than 10% from desired polymerization conditions, an occurrence of a disturbance is established and step B) of the process is carried out.

In some embodiments, upon the occurrence of a disturbance or temporally offset to the occurrence of a disturbance, alternatively a delay in the range from 2 to 30 seconds, alternatively from 4 to 16 seconds, steam, alternatively medium pressure steam, is injected into the reactor blow down vessel, alternatively via the vent stack.

In some embodiments, the injection of steam into the reactor blow down vessel, alternatively via the vent stack, is suspended after about 120 to 300 seconds, alternatively about 140 to 220 seconds, upon the occurrence of a disturbance.

In some embodiments, the drain valve is opened to transfer the aqueous polymer slurry to the reactor blow down dump vessel after the first emergency valve or the combination of previously open emergency valves is closed. In some embodiments, the drain valve is remotely operated or operable.

In some embodiments, when a disturbance occurs, the polymerization is restarted after the reactor blow down vessel is emptied. In some embodiments, the reactor blow down vessel is emptied by transferring the aqueous polymer slurry to a reactor blow down dump vessel.

In some embodiments, the first emergency valve or the combination of previously open emergency valves are closed after step B) while the fluid communication system, or the fluid communication system and the third connecting line and/or the fourth connecting line experience a positive pressure.

In some embodiments, the reactor blow down vessel and the reactor blow down dump vessel are inside a protective enclosure. In some embodiments, the protective enclosure is referred to as a "reactor bay". In some embodiments, the blow down separator or the combination of blow down separator elements are outside a protective enclosure. In some embodiments, the circulation pump or the circulation pumps are outside a protective enclosure.

In some embodiments, the aqueous quenching medium is water. In some embodiments, the aqueous quenching medium is made from or containing water and a polymerization inhibitor. In some embodiments, the process is to produce ethylene copolymers. In some embodiments, the polymerization inhibitor is hydroquinone or a pH buffer agent. In some embodiments, the buffer agents are made from or containing phosphate buffers. In some embodiments, the phosphate buffers are obtained by mixing sodium hydrogen phosphate and sodium hydroxide.

With the process of the present disclosure, the content of the polymerization system is expanded into the reactor blow down vessel and contacted with the aqueous quenching system. In some embodiments, the pressure in the continuous high-pressure polymerization system reduces rapidly. In some embodiments, the reduction of pressure takes place within a minute or even less and the pressure is reduced from about or above 200 MPa to 0.1 MPa. In some embodiments, the gaseous components are released from this vessel, and the water/polymer mixture is removed from the reactor blow down dump vessel.

Further features of the present disclosure will become apparent from the following description, in which exemplary embodiments of the disclosure are explained with reference to FIG. 1-FIG. 5, by way of example and without limiting the disclosure.

FIG. 1 is a schematic of a reactor blow down system (1) having a reactor blow down vessel (2), lower release line outlets (8), upper release line outlets (9), and a vent stack (14). The reactor blow down vessel (2) has a cylindrical portion having a length L which is designated "major portion P" (4). The major portion P (4) has a diameter D. The major portion P (4) has an L/D ratio of about 2.1. Above major portion P (4), the reactor blow down vessel (2) has a tapered lid-like portion, of which the center part equipped with the lower part of the vent stack (14). The lower part (26) of the reactor blow down vessel (2) has a conical shape for providing the aqueous quenching medium (6). The surface (20) of the aqueous quenching medium (6) lies beneath the overflow valve (22). In some embodiments, the aqueous quenching medium (6) is added to the reactor blow down vessel (2) via water inlet valve (24). In some embodiments, nitrogen for blanketing the reactor blow down vessel is introduced through nitrogen inlet (16). The lower and upper release line outlets (8),(9) each have a joining piece (10) and (11), respectively, through which hot gas and hot polymer enter the reactor blow down vessel (2) when a disturbance occurs. The joining pieces (10),(11) are oriented such that the angle of inclination (β) between the central axes (12), (13) of the respective joining pieces (10) and (11), respectively, and the horizontal plane passing through the major portion P (4) of the reactor blow down vessel (2) where the central axes (12) and (13), respectively, cross the horizontal circumference of the major portion P (4) is about 12°. The joining pieces (10) and (11) are arranged tangentially to the horizontal circumference of the major portion P (4). For the ease of representation in FIG. 1, a first joining piece (10) connected to an accompanying release line outlet (8) is depicted on a first horizontal level as a representative for a multitude of such joining pieces (see FIG. 2), and a second joining piece (11) connected to an accompanying release line outlet (9) is depicted on a second horizontal level, lying above the first horizontal level, as a representative for a multitude of such joining pieces (see FIG. 3). In some embodiments and at the bottom of the conically shaped lower part (26) of the reactor blow down vessel (2), an outlet (28) is located. In some embodiments, the outlet (28) is opened and closed remotely. In some embodiments, sedimented polymer is removed through outlet (28).

Figure 2:
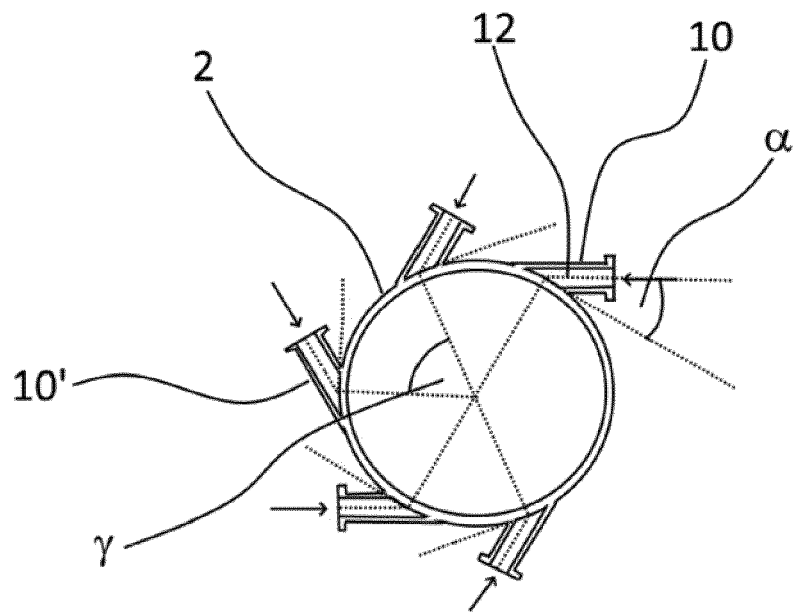
FIG. 2 is a schematic cross-sectional view of the reactor blow down system according to FIG. 1.
Figure 3:
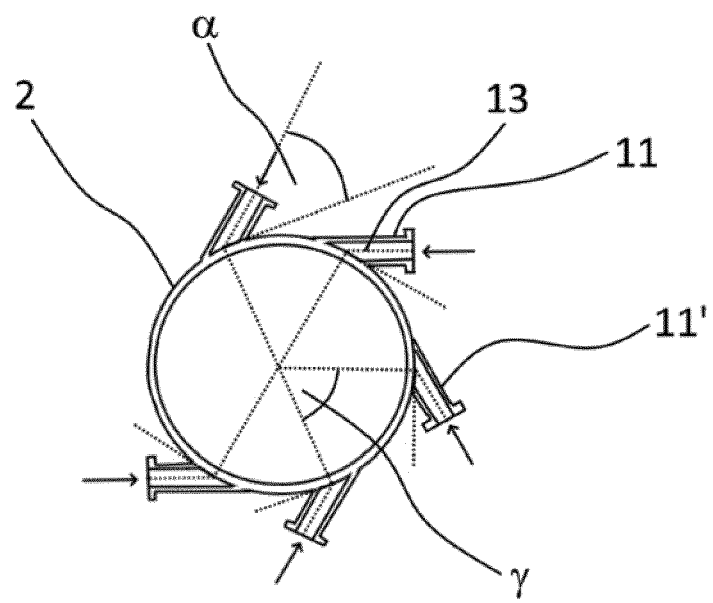
FIG. 3 is a schematic cross-sectional view of the reactor blow down system according to FIG. 1.

FIG. 2 depicts a cross-sectional view through the major portion P (4) at the level of the lower joining piece (10) in FIG. 1. FIG. 3 depicts a cross-sectional view through the major portion P (4) at the upper level of the joining piece (11). In FIG. 2, the reactor blow down vessel (2) at the lower level has five joining pieces (10) arranged tangentially to the circumference of the major portion P (4). The angle (α) between the central axes (12) of these joining pieces (10) and the respective tangents at the crossing points between the respective central axes (12) and the circumference of the major body portion P (4) is about 42°. The tangent has the same inclination to the horizontal plane which extends through the major portion P at the level of the entry of the central axis into the circular perimeter of the section P, as the central axis (12). Three of the five lower joining pieces (10) have the same distance along the circumference to respective neighboring joining pieces (10). The center angle (γ) between these adjacent joining pieces (10) is about 30° with the embodiment of the reactor blow down vessel (2). Hot gases and hot polymer material entering the reactor blow down vessel (2) through the lower joining pieces (10) is directed first along the inner wall of the cylindrical major portion P (4) of the reactor blow down vessel (2). The design of the second set of joining pieces (11) at the upper level is similar to the design of the first set of the joining pieces (10) at the lower level. The angle (α) between the central axes (13) of these upper joining pieces (11) and the respective tangents at the crossing points between the respective central axes (13) and the circumference of the major body portion P (4) is about 42°. Three of the five upper joining pieces (11) have the same distance along the circumference to respective neighboring joining pieces (10). The center angle (γ) between these adjacent joining pieces (11) is about 30°. The joining piece (10') which has no opposite counterpart at the lower level has an opposite counterpart (11') at the upper level.

Figure 4:
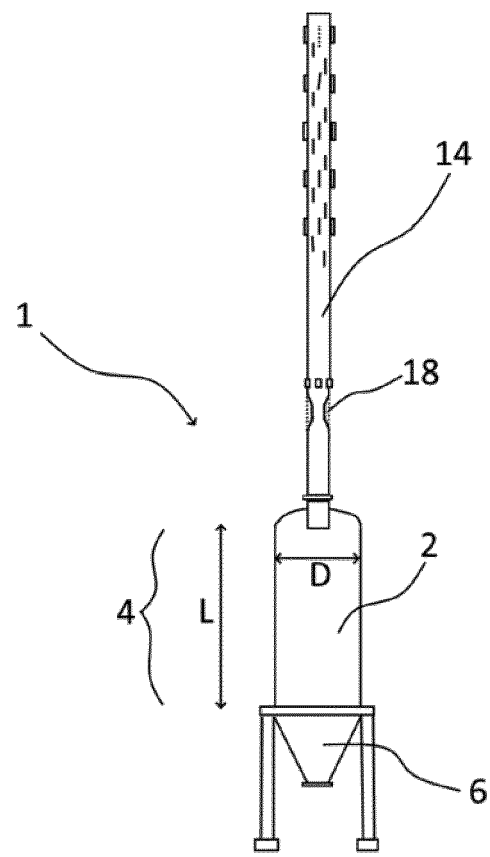
FIG. 4 is a schematic of a reactor blow down system.
Figure 5:
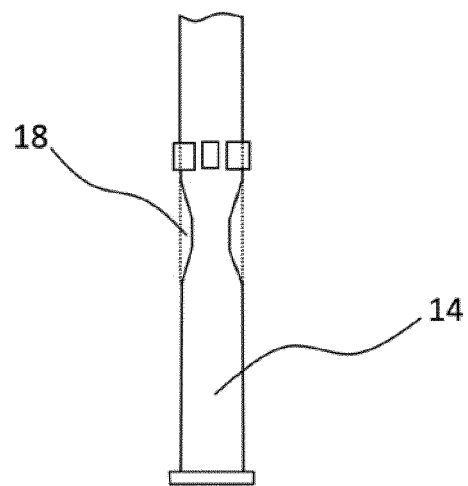
FIG. 5 is a schematic of a section of the vent stack of the reactor blow down system according to FIG. 4.

FIG. 4 shows a schematic of the reactor blow down system (1). A vent stack (14) extends from the center of the upper part of the reactor blow down vessel (2). The hot gas separated from the polymeric material introduced into the reactor blow down vessel (2) escapes through the vent stack (14). In some embodiments and by employing a constricted section (18) as part of the vent stack (14), the noise generated by released gases is reduced. FIG. 5 provides an enlarged representation of the constricted section (18) of the vent stack (14).

In some embodiments and with the process and the high-pressure polymerization system of the present disclosure, the reactor is automatically depressurized by automatically opening the emergency valve when a disturbance or an emergency occurs, thereby putting the reactor into a safe condition. That is, the process and the high-pressure polymerization system of the present disclosure permit stopping safely polymerization n case of an emergency or deviations. In some instances, an emergency includes events such as fire, explosion, earthquake, or polyethylene decomposition. In some instances, disturbances include deviations from the standard operating conditions.

Other features and embodiments of the subject matter of the present disclosure will be readily apparent to a person of ordinary skill in the art after reading the foregoing disclosure. In this regard, while specific embodiments have been described in considerable detail, variations and modifications of these embodiments can be effected without departing from the spirit and scope of the disclosure as described and claimed.

The invention claimed is:

1. A high-pressure polymerization system comprising
a) a continuously operable polymerization reactor having a reactor inlet and having a reactor outlet and
b) a reactor blow down system adapted and arranged to be in fluid communication with the polymerization reactor, the reactor blow down system comprising
b1) a reactor blow down vessel, having a circular design over a major portion P having a length L, a diameter D and a L/D-ratio in the range from 1.75 to 10.0, and containing an aqueous quenching medium,
b2) a release line, connecting the polymerization reactor with the reactor blow down vessel and having a release line outlet for expanding a content of the high-pressure polymerization system comprising polymer and gaseous components into the reactor blow down vessel, wherein the release line outlet is located above a maximum level for the aqueous quenching medium, and
b3) a first emergency valve arranged in the release line and adapted to open and close fluid communication between the polymerization reactor and the reactor blow down system,
wherein the release line outlet has a joining piece, having a central axis and arranged such that an angle (α), formed between the central axis of the joining piece and a tangent located at the intersection of the central axis with the circular periphery of the major portion P of the reactor blow down vessel and having the same inclination as the central axis with respect to the horizontal plane containing this intersection, is in the range from 5° to 70°, and
wherein the reactor blow down vessel further comprises a vent stack containing a constricted section.

2. The high-pressure polymerization system of claim 1, wherein the joining piece is arranged tangentially to the horizontal circumference of the major portion P.

3. The high-pressure polymerization system of claim 1, wherein the joining piece is inclined downwards such that the stream of the content of the high-pressure polymerization system comprising polymer and gaseous components is directed towards a surface of the aqueous quenching medium in the reactor blow down vessel.

4. The high-pressure polymerization system of claim 3, wherein an angle of inclination (β) between the central axis of the joining piece and horizontal plane passing through the major portion P of the reactor blow down vessel at the position where the central axis crosses the horizontal circumference of the major portion P is in the range from 3° to 89°.

5. The high-pressure polymerization system of claim 1, wherein a multitude of release lines connects the polymerization reactor with the reactor blow down vessel.

6. The high-pressure polymerization system of claim 5, wherein a multitude of joining pieces of the release line outlets of the release lines connecting the polymerization reactor with the reactor blow down vessel are located on the same horizontal level of the major portion P of the reactor blow down vessel, and/or
    a multitude of joining pieces of the release line outlets of the release lines connecting the polymerization reactor with the reactor blow down vessel are equidistantly or evenly distributed over the circumference of the major portion P of the reactor blow down vessel.

7. The high-pressure polymerization system of claim 6, wherein a first set of joining pieces of release line outlets of release lines connecting the polymerization reactor with the reactor blow down vessel is located on the same horizontal level of the major portion P of the reactor blow down vessel, and wherein a second set of joining pieces of release line outlets of release lines connecting the polymerization reactor with the reactor blow down vessel is aligned horizontally on the major portion P of the reactor blow down vessel at a horizontal level different from the horizontal level of the first set of joining pieces.

8. The high-pressure polymerization system of claim 1, further comprising
    c) a pressure control valve,
    d) a post reactor cooler, and
    e) a separation vessel or a series of separation vessels,
        wherein the post-reactor cooler is in fluid communication with the continuously operated polymerization reactor via f) a first connecting line, wherein the separation vessel or the series of separation vessels is in fluid communication with the post-reactor cooler via g) a second connecting line, and wherein the pressure control valve is adapted and arranged to control fluid communication between the continuously operated polymerization reactor and the post-reactor cooler.

9. The high-pressure polymerization system of claim 1, wherein the vent stack is a vertical tube having an inner diameter from 0.4 m to 1.4 m and the constricted section of the vent stack has a smaller inner diameter, thereby rendering the open cross-sectional area at the constricted section from 10% to 60% of the open cross-sectional area of the vertical tube.

10. The high-pressure polymerization system of claim 1, wherein the reactor blow down system further comprises
    b4) a nitrogen blanketing system, and/or
    b5) a fill-level control system.

11. The high-pressure polymerization system of claim 1, wherein the reactor blow down system further comprises
    b6) a reactor blow down dump vessel arranged and adapted to be in fluid communication with the reactor blow down vessel, and
    b7) a drain valve in fluid communication between the reactor blow down vessel and the reactor blow down dump vessel adapted and arranged to open or close fluid communication between the reactor blow down vessel and the reactor blow down dump vessel,
    wherein the reactor blow down vessel is installed above the reactor blow down dump vessel.

12. A process for polymerizing ethylene, and optionally one or more co-monomers, to obtain an ethylene-based polymer in a high-pressure polymerization system according to claim 1, comprising the steps of:
    A) monitoring the high-pressure polymerization system for a disturbance, and
    B) opening a first emergency valve b3) when a disturbance occurs, thereby allowing the content of the polymerization system comprising polymer and gaseous components to expand into the reactor blow down vessel via the release line,
    C) contacting the content of the polymerization system in the reactor blow down vessel with the aqueous quenching medium, thereby obtaining an aqueous polymer slurry, and
    D) separating the aqueous polymer slurry and the gaseous components.

13. The process of claim 12, wherein, upon the occurrence of a disturbance or temporally offset to the occurrence of a disturbance, steam is injected into the reactor blow down vessel.

14. The process according to claim 13, wherein the injection of steam is suspended after about 120 to 300 seconds upon the occurrence of a disturbance.

15. The process of claim 12, wherein the high-pressure polymerization system further comprises
    c) a pressure control valve,
    d) a post reactor cooler, and
    e) a separation vessel or a series of separation vessels,
        wherein the post-reactor cooler is in fluid communication with the continuously operated polymerization reactor via f) a first connecting line, wherein the separation vessel or the series of separation vessels is in fluid communication with the post-reactor cooler via g) a second connecting line, and wherein the pressure control valve is adapted and arranged to control fluid communication between the continuously operated polymerization reactor and the post-reactor cooler.

16. The process of claim 12, wherein the vent stack is a vertical tube having an inner diameter from 0.4 m to 1.4 m and the constricted section of the vent stack has a smaller inner diameter, thereby rendering the open cross-sectional area at the constricted section from 10% to 60% of the open cross-sectional area of the vertical tube.

17. The process of claim 12, wherein the release line connecting the polymerization reactor with the reactor blow down vessel is heated to a temperature from 160° C. to 240° C.

18. The process of claim 12, wherein the reactor blow down system further comprises
    b4) a nitrogen blanketing system, and/or
    b5) a fill-level control system.

19. The process of claim 12, wherein the reactor blow down system further comprises
    b6) a reactor blow down dump vessel arranged and adapted to be in fluid communication with the reactor blow down vessel, and
    b7) a drain valve in fluid communication between the reactor blow down vessel and the reactor blow down dump vessel adapted and arranged to open or close fluid communication between the reactor blow down vessel and the reactor blow down dump vessel, wherein the reactor blow down vessel is installed above the reactor blow down dump vessel.

* * * * *